United States Patent Office 2,863,444
Patented Dec. 9, 1958

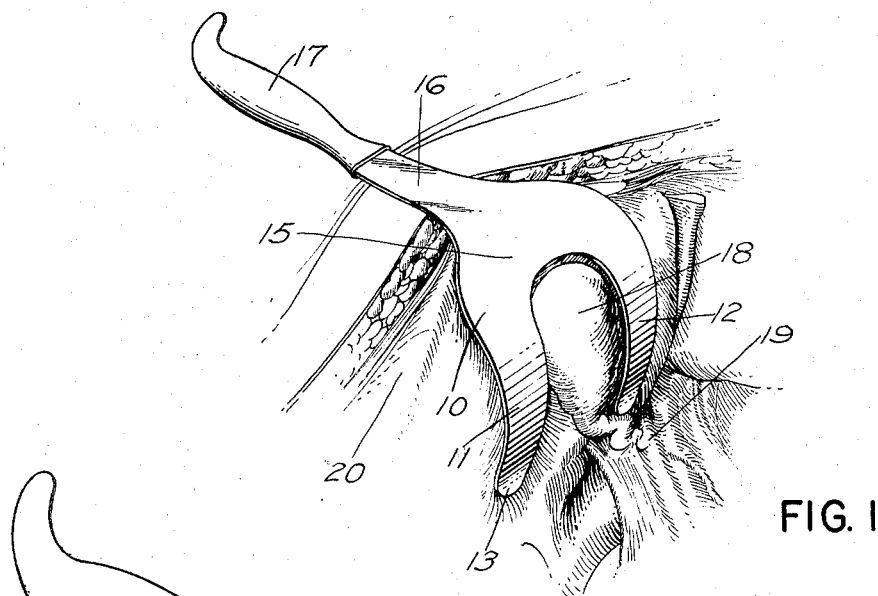
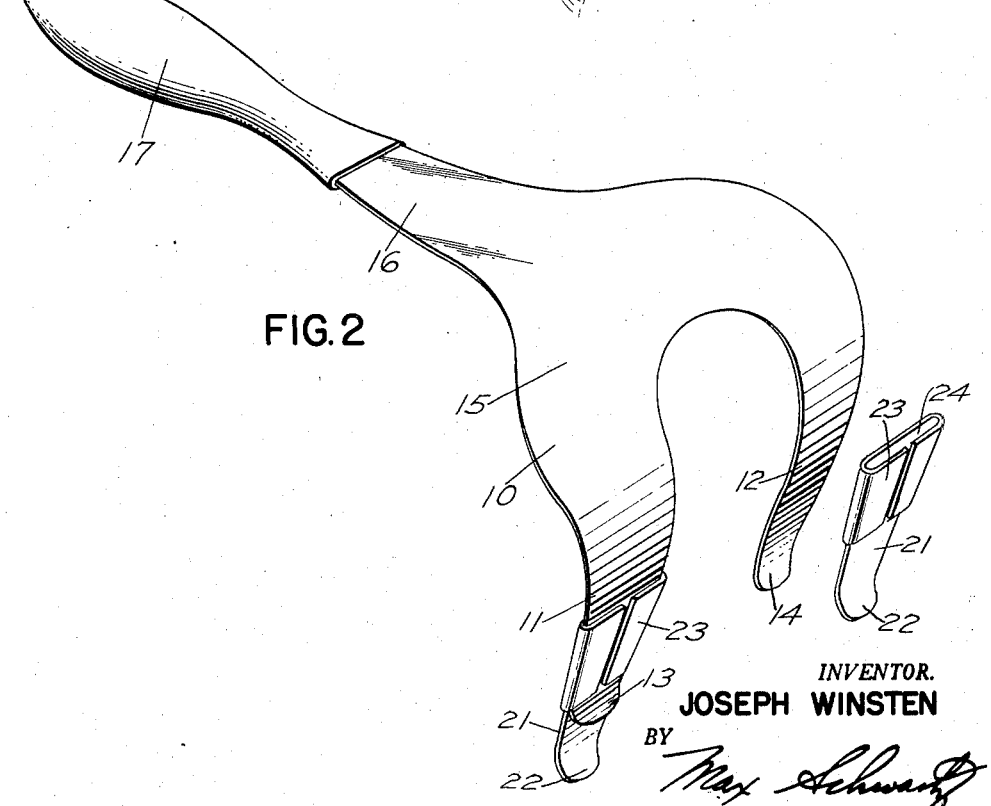
INVENTOR.
JOSEPH WINSTEN
BY
ATTORNEY

2,863,444

LIVER RETRACTOR FOR CHOLECYSTECTOMIES

Joseph Winsten, Fresh Meadows, N. Y.

Application August 21, 1956, Serial No. 605,264

4 Claims. (Cl. 128—20)

My present invention relates to surgical instruments, and more particularly to a novel retractor for use in gall bladder operations.

The principal object of the present invention is to provide a retractor which will permit one assisting hand to retract on both sides of the gall bladder.

Another object of the present invention is to provide a retractor having means for adjusting the length of the blades when necessary.

A further object of the present invention is to provide a retractor for a gall bladder operation which is simple in construction and easy and economical to manufacture and assemble.

With the above and other objects and advantageous features in view, my invention consists of a novel arrangement of parts, more fully disclosed in the detailed description following, in conjunction with the accompanying drawings, and more particularly defined in the appended claims.

In the drawings,

Fig. 1 is a perspective view showing the retractor in use during an operation.

Fig. 2 is an enlarged perspective view of the retractor and extender elements.

During a cholecystectomy, it is important that the surgeon readily visualize the vital structures in the biliary tract. This is always considered an important safety factor. Usually, a conventional Deaver retractor is positioned on each side of the gall bladder and extending down to the porta. However, this requires two assisting hands and it is difficult to keep both retractors in a constant position. The retractor of the present invention is designed to overcome these difficulties by providing a single unitary structure with spaced retracting blades that cannot move independently of each other. Thus only one assisting hand is required to retract on both sides of the gall bladder. Furthermore, provision is made to adjust the blades for greater depth where necessary or where the gall bladder occupies an oblique position.

Referring more in detail to the drawings, the retractor comprises an inverted U-shaped member 10 preferably made of thin spring-metal stainless steel. The depending vertical arms 11 and 12 are curved slightly forwardly with the rounded tips 13 and 14 bent slightly forwardly. The upper ends of the arms 11 and 12 are integrally joined to a wide shank portion 15 which curves rearwardly to substantially right angles to the arms 11 and 12. The shank 15 narrows integrally to a portion 16 which is mounted in a suitable handle member 17. The blades 11 and 12 should be approximately 5 cm. apart for most of their lengths.

In use, as shown in Fig. 1, the blades 11 and 12 extend into the incision on each side of the gall bladder 18, the gall bladder 18 and ductal structures 19 lying free in the wound between the blades. The width of the portion 15 is such that the liver 20 is retracted out of the field of vision for practically the length of the incision. Because of this width, the retractor functions best where a subcostal incision is made, but it can be used in certain cases with a transverse or oblique incision.

Where the skin-to-porta distance is greater than usual, as in obese patients, the length of the arms 11 and 12 may be extended by as much as 1.5 cm. by the extender elements shown in Fig. 2. Each extender element comprises a shank 21 having a rounded, bent tip 22 similar to the tips 13 and 14 of the arms. The upper end of the shank 21 is provided with integral flaps 23 at each side edge and bent with a U-bend toward each other to form a slot 24. The size of the slot 24 is such that the extender can be forced onto the arms 11 and 12 (arm 11 illustrated) to be frictionally retained in position in use.

If the gall bladder occupies an oblique position in relation to the liver edge 20, the retractor must be held obliquely. In such cases the extender can be put on one arm only as seen in Fig. 2 to obtain the necessary depth on the medial blade.

The retractor is simple in construction and easy to use. One hand will accomplish the work of two and do it more efficiently and steadily. Other advantages of the present invention will be readily apparent to a person skilled in the art.

I claim:

1. A retractor comprising a pair of integrally formed spaced arms disposed in an inverted U-shape, an integral shank portion joining the upper ends of said arms and bent at right angles thereto, said shank tapering to form a narrow portion, and a handle mounted on the narrow portion of said shank, and means for extending the effective length of either of said arms, said means comprising an extender element for the free end of each arm, each extender element comprising a flat body portion having a rounded bent tip at one end and integral reentrantly bent side portions adjacent the other end forming a slot adapted to frictionally engage the end portion of said arm.

2. A retractor comprising a pair of integrally formed spaced arms of flat spring stainless steel disposed in an inverted U-shape, said arms being bent slightly outwardly and terminating in a rounded bent end, an integral shank portion joining the upper ends of said arms and bent at right angles thereto, said shank tapering to form a narrow portion, and a handle mounted on the narrow portion of said shank, and means for extending the effective length of either of said arms, said means comprising an extender element for the free end of each arm, each extender element comprising a flat body portion having a rounded bent tip at one end and integral reentrantly bent side portions adjacent the other end forming a slot adapted to frictionally engage the end portion of said arm.

3. A retractor comprising a pair of integrally formed spaced arms disposed in an inverted U-shape, an integral shank portion joining the upper ends of said arms and bent at right angles thereto, said shank tapering to form a narrow portion, and a handle mounted on the narrow portion of said shank, said shank having a width substantially equal to the length of the incision and said arms being approximately 5 cm. apart, and means for extending the effective length of either of said arms, said means comprising an extender element for the free end of each arm, each extender element comprising a flat body portion having a rounded bent tip at one end and integral reentrantly bent side portions adjacent the other end forming a slot adapted to frictionally engage the end portion of said arm.

4. A retractor comprising a pair of integrally formed spaced arms of flat spring stainless steel disposed in an inverted U-shape, said arms being bent slightly outwardly and terminating in a rounded bent end, an integral shank portion joining the upper ends of said arms and bent at right angles thereto, said shank tapering to form a narrow portion, and a handle mounted on the narrow portion of said shank, said shank having a width substantially equal to the length of the incision and said arms being approximately 5 cm. apart, and means for extending the effective length of either of said arms, said means comprising an extender element for the free end of each arm, each extender element comprising a flat body portion having a rounded bent tip at one end and integral reentrantly bent side portions adjacent the other end forming a slot adapted to frictionally engage the end portion of said arm.

References Cited in the file of this patent

UNITED STATES PATENTS

| | | |
|---|---|---|
| 1,238,001 | Cameron | Aug. 21, 1917 |
| 1,474,497 | Stolper | Nov. 20, 1923 |
| 2,695,607 | Hipps et al. | Nov. 30, 1954 |

FOREIGN PATENTS

| | | |
|---|---|---|
| 17,376 | Great Britain | Oct. 21, 1893 |

OTHER REFERENCES

The Kny-Scheerer Catalogue, page 4042, Figures D/2201 and D/2203, copyright 1921. (Copy in Division 55.)